United States Patent Office 3,331,572
Patented July 18, 1967

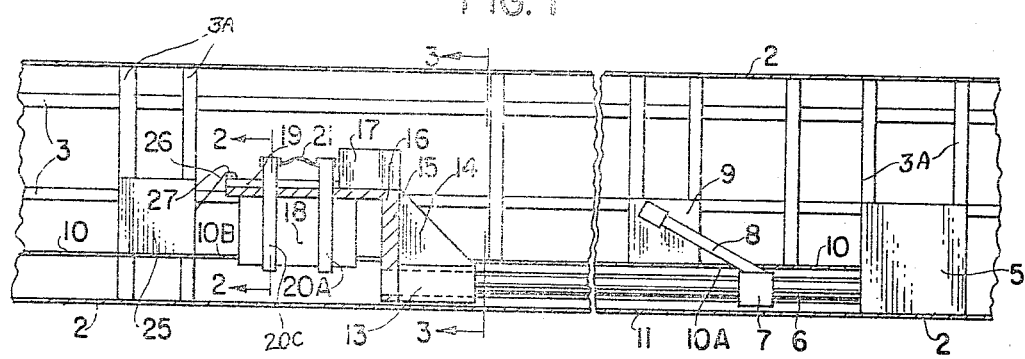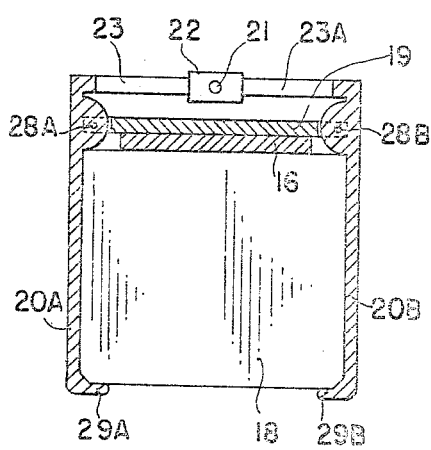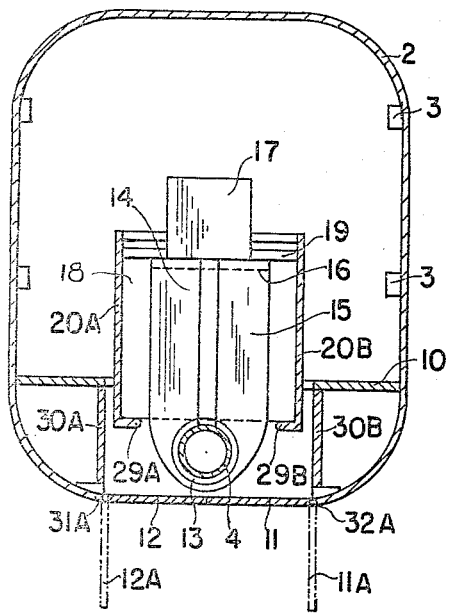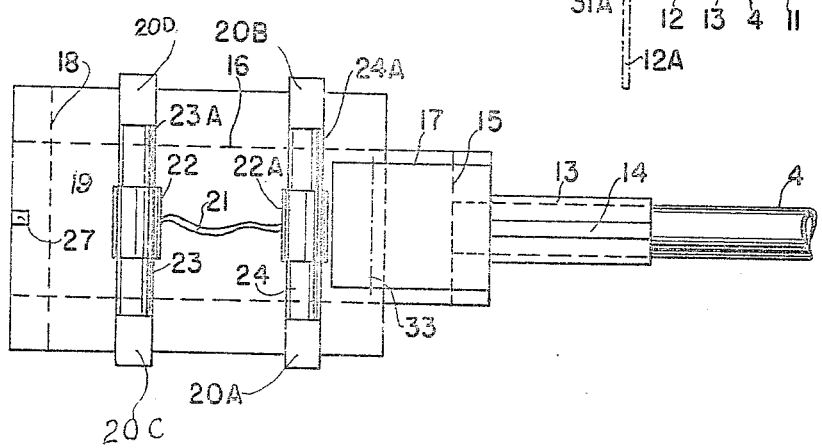

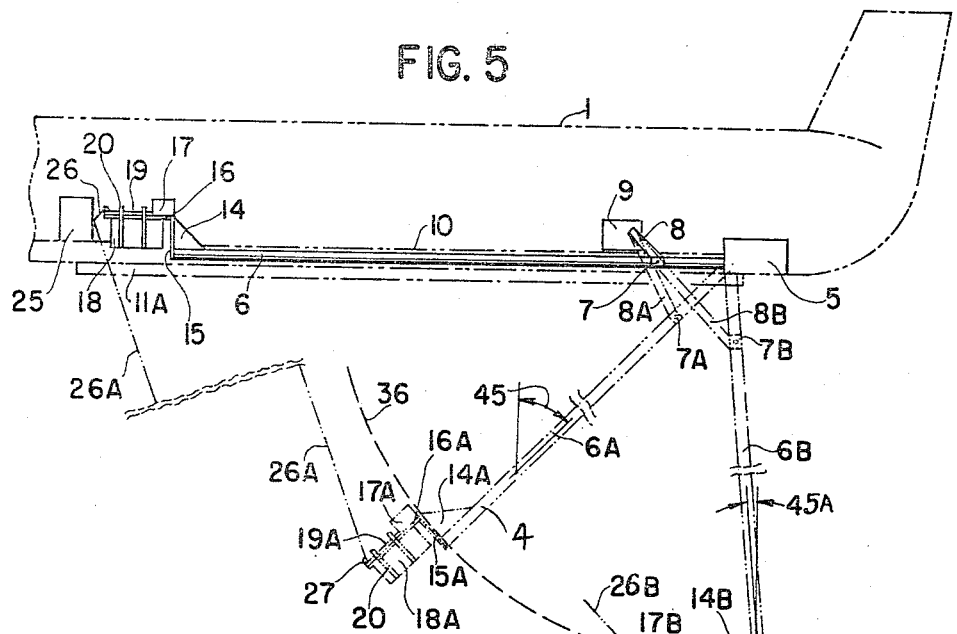
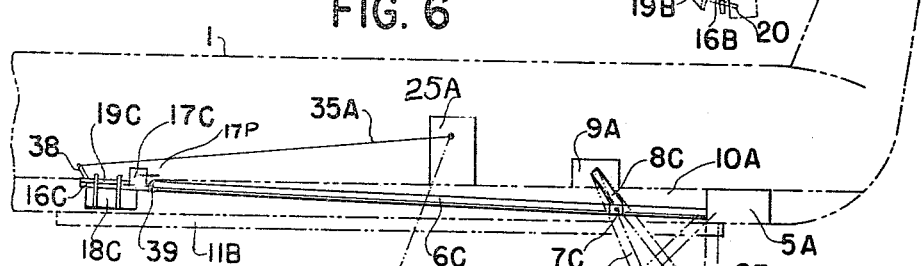
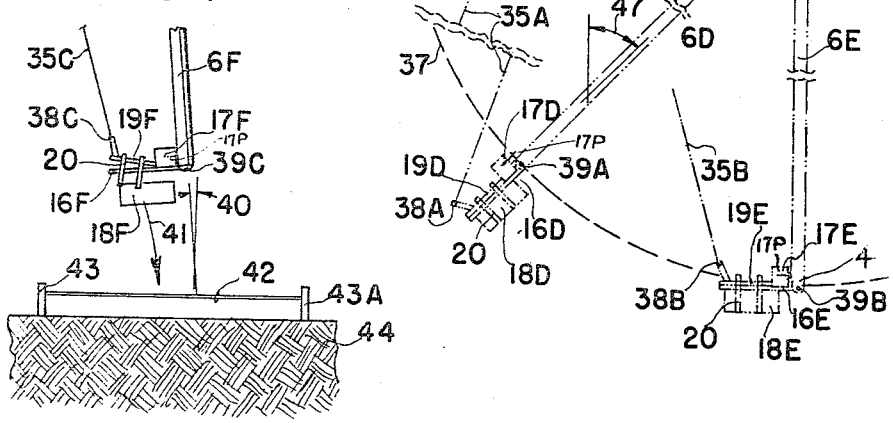

3,331,572
AIRCRAFT IN-FLIGHT UNLOADING SYSTEM
Joel B. Guin, 148 E. 48th St.,
New York, N.Y. 10017
Filed May 3, 1965, Ser. No. 452,700
2 Claims. (Cl. 244—137)

ABSTRACT OF THE DISCLOSURE

This invention relates to an aircraft in-flight unloading system with which cargo of moderate size can be transferred from a plane flying low and at moderate speed to a ground station by means of a telescoping boom that holds the cargo and swings it backward at a speed approximately equal to the forward ground speed of the plane, the cargo holder then being tripped to unload the cargo at approximately zero ground speed. The telescoping boom is extensible and retractable, lies within and along the lower part of the fuselage, is attached aft of the plane's center of gravity, and is activated by a powered arm from within the fuselage that slides along the beam and can swing the beam down and backwards at a controlled speed that exactly counteracts the plane's forward speed at the lowest part of its curved path at which point a device triggered automatically by mechanical or electrical means releases a now-almost-stationary-in-space package a few feet above the ground. For this, but more particularly for less-sturdy cargo, and all personnel, a shock-absorbing means, such as a trampoline, large air mattresses floating on water, nets, etc., would be an essential part of the system. Skilled aircrews should be able to unload fragile cargo or well-trained military personnel with less danger than parachutes, especially near water, trees or canyons, and on windy days.

---

Man has proved he can travel safely on or under the water, in and above the air, and on the land, all at high speed, but the transition from one element to the other is done only at reduced speed, at some risk, and with mental disturbance. Even today there is no commercial transfer of cargo or personnel between the air and ground at flying speed. The military leaps the wall only by using expensive shock-absorbing equipment for the sturdy cargo, and parachutes for regular equipment and all personnel. Under adverse wind conditions, the latter can result in unmitigated disaster, as shown in most low-country paradrops in World War II and in dozens of Army-Air Force maneuvers and exercises since. Even under the best conditions, dozens of acres under safe, friendly control beyond enemy firing range, are essential for success.

The objects of this invention are: to make it possible to transfer cargo and personnel quickly from aircraft to ground or water at moderate flight speed and minimum altitude (too low for enemy snipers), on even the windiest days, within a cleared area down to 50 x 350 yards in the jungle, or 20 x 60 yards on desert or water; to fight guerrilla wars such as those in Southeast Asia and the Congo; to supply advanced or surrounded forces in any war; to land agents or saboteurs in war or peace; to land emergency supplies to ship-wrecked crews, flooded areas, disaster areas, storm-isolated areas, or any place we need to go quickly that has no regular air service; to supply construction crews, oil-well drilling crews, jungle outposts, Dew Line-Pinetree-BMEWS Stations, satellite tracking stations, etc.; and to supply air cargo service to districts that generate too little air traffic to justify a cargo plane stop.

This invention can be used in conjunction with in-flight cargo and personnel loading, for which an application is being filed. Much equipment is common to both, but enough is different to justify a separate patent application.

Other advantages and objects of this invention will become clear when the detailed description is examined in conjunction with the accompanying drawings in which:

FIG. 1 is a vertical section through a plane showing the essential parts of the unloader system;

FIG. 2 is a vertical section taken along line 2—2 in FIG. 1;

FIG. 3 is a vertical section along line 3—3 in FIG. 1 showing the connection between extensible beam and cargo section;

FIG. 4 is a top view of the cargo section;

FIG. 5 shows schematically the various stages of unloading;

FIG. 6 shows schematically the various stages of unloading used in a modified version of the system;

FIG. 7 shows the lower part of the beam and rope unloading the cargo over a shock-absorbing means (a trampoline).

Details of operation will be explained along with the description of the various drawings to which we now turn:

FIG. 1 shows the essential parts of the system placed within the aircraft 1, whose outer structure 2, supporting beams 3 and ribs 3A will need some reinforcing if this equipment is installed in a regular plane. The heart of the system is main beam 6 which is held horizontally in a compartment below the fuselage floor 10 and is attached at one end to a bearing and power unit 5. Sliding along beam 6 is a bearing-plunger connection 7 to which plunger arm 8 is attached, the plunger being activated by and attached to power unit 9. Both power units 5 and 9 may be activated by pneumatic, hydraulic or electrical means to push it out and back. Vertical plate 15, which serves as the main support for the cargo 18 holding apparatus, is stabilized at the cargo-end of beam 6 by means of supporting plate 14 which is joined to fastening cylinder 13 around the end of a beam (4 in FIG. 3) held within and extending from beam 6. Lower horizontal plate 16, joined to vertical plate 15 has cargo 18 held against it by clamps 20A and 20C (and clamps 20B and 20D in FIG. 4) which are attached to and pivot around upper horizontal plate 19, which hinges on a pivot within triggering unit 17 which is attached to the beam end of lower horizontal plate 16. Electrical circuit connection 21 runs from triggering unit 17 to two magnetic units (22 and 22A in FIG. 4) that activate the clamps 20A, 20C, etc. Connected to upper horizontal plate 19 at end 27, is a rope or wire 26 which is wound around drum 25 and attached to the shaft or windlass therein which is held under sufficient tension to take up any slack in the rope or wire 26 at any time.

FIG. 2 is a vertical section along line 2—2 in FIG. 1, showing how right clamps 20B (and 20D) and left clamps 20A (and 20C, not shown) with ends-at-right angles 29B and 29A respectively fitting around cargo 18 and attached to upper horizontal plate 19 by pins 28A and 28B respectively, around which they turn when pushed or pulled by plungers 23 and 23A respectively, which are inserted into and activated by magnets within magnetic units 22 (and 22A, FIG. 4) which receive their power through electrical circuit 21.

FIG. 3 is a section taken along line 3—3 in FIG. 1, showing the arrangement by which telescoping beam (6 in FIG. 1) is attached to the cargo apparatus. Beam section 4 is a rear extension of beam 6 in FIG. 1 and fits within fastening ring 13 to which supporting plate 14 is attached. Vertical plate 15 is attached to plate 14 and in turn has attached to its upper end lower horizontal plate 16. On top of plate 16 is attached triggering unit 17 back of which is located upper horizontal plate 19 extending from and pivoted on a bearing within triggering unit 17.

Fuseage 2 is supported by beams 3. The regular floor 10 has an open area cut out to admit the beam and cargo apparatus. Below the beam and cargo is a bottom floor, the right half 11 and left half 12 of which are lowered to positions 11A and 12A respectively preparatory to unloading. Left and right floor connections are represented by 30A and 30B, respectively. Cargo 18 which lies back of vertical plate 15, is inclosed between left and right clamps 20A and 20B. The lower ends of these clamps, 29A and 29B respectively, support the lower corners of cargo 18.

FIG. 4 is a top view showing cargo 18 and apparatus for holding it. The lower section 4 of telescoping beam 6 (FIG. 1) extends into fastening cylinder 13 to which is attached supporting plate 14, attached to vertical plate 15. Lower horizontal plate 16 is represented by dotted lines on the top of which triggering unit 17 is placed. Extending from the rear of unit 17 is upper plate 19 which pivots on hinge 33. Right and left clamps 20A and 20B, respectively, which are attached to the sides of upper plate 19 and pivot thereon have plungers 24 and 24A attached to their upper ends, between which clamps is magnetic unit 22A connected by circuit 21 to unit 17. Between and attached to clamps 20C and 20D are plungers 23 and 23A extending into magnet unit 22 which pulls and pushes them according to unit 17's signals. Rope 26 is attached at 27. Units 22 and 22A may be hydraulically powered, etc.

FIG. 5 shows schematically various stages in one method of unloading cargo 18 from plane 1. When cargo 18, surrounded by clamps 20, attached to plate 19, is about to be released, bottom door halves 11 and 12 are lowered to positions 11A and 12A respectively (in FIG. 3). The path of the end of beam 4, which is within and extends out of beam 6, as it travels downward is shown by dotted line 36, the angle of which with the horizontal is shown at 45. As cargo 18 descends to position 18A it unwinds wire or rope 26 from drum 25 and assumes path 26A. Plunger 8 extends to position 8A, as beam 6 assumes position 6A and upper plate 19 moves to 19A, etc. At the lowest point of its path, upper plate 19 has "reached the end of its rope," 26B and is pulled outward, turning on pivot (33 in FIG. 4) within triggering unit 17B, thus activating a signal through circuit 21 (in FIG. 4) which causes magnet units (22 and 22A in FIG. 4) to draw in plungers 24, 24A, 23 and 23A (in FIG. 4) which retract clamps 20, releasing the cargo 18B just as its path turns up slightly. Since at this moment the backward movement of the end of beam 4 and cargo 18B is approximately equal to the forward motion of the plane, the cargo is momentarily stationary in space, and drops to the ground a few feet below, or to a shock-absorbing device such as the trampoline (42, FIG. 7), a net, air mattresses on water, etc.

FIG. 6 shows schematically the various stages in a modified method for in-flight unloading. The only differences are: a special plunger 17P extending from the beam-side of triggering unit 17C; a different triggering action within triggering unit 17C; the location of rope drum 25 which is here positioned farther aft at 25A; and rope 35A which must be much stronger than rope 26 of FIG. 5 due to its new function. To assist the new triggering action a special lever-bar 38 is attached at the end of upper horizontal plate 19. Rope (or wire) 35A becomes vertical half-way through its path and is kept taut by a spring on the rope shaft within 25A or a similar tautening means. (This is not essential to the system, will not be claimed, and is not drawn.) As cargo 18C reaches position 18D the entire apparatus at the end of beam 4, including plate 19D, triggering unit 17D and cargo 18E, begin to turn back and up, pivoting at 39A on the end of beam 4, extending from beam 6 in FIG. 1. Before beam 6D reaches vertical position 6E, arm 8D reaches position 8E, and the path of rope 35A reaches position 35D; drum 25A ceases paying out rope (or wire) and the cargo becomes horizontal.

FIG. 7 shows the lower part of the cargo unloading system, with a trampoline 42 as shock absorber for catching the cargo 18F. It continues the action described under FIG. 5. As soon as horizontal plate 19E is lifted by lever-bar 38C to position 19F, plunger 17P is pushed against beam 4 causing 17P to move into triggering unit 17F, thus activating the same sequence as in FIG. 5; unit 17F sends an electrical signal through circuit 21 (of FIG. 4) into magnetic units 22 and 22A (FIG. 4) which retracts the clamps around cargo 18F, which is then temporarily stationary in space, dropping in path 41 to one of many possible shock-absorbing devices, one of the simplest being a net or trampoline such as 42, stretched between posts 43 and 43A above ground 44.

A chair or personnel-holding device may be inclosed within a cargo-holding apparatus described in FIGS. 2, 3 and 4, just as if it were also cargo, or it may replace the cargo-holding apparatus, being specially constructed to be attached to the end of the telescoping beam.

I claim:

1. A system for transferring cargo from a low flying aircraft to a ground station at approximately zero horizontal velocity comprising
   an aircraft,
   a longitudinal recess in the bottom of the aircraft,
   telescoping boom means pivotally attached at its rear end to said aircraft and being received in said recess,
   cargo support means attached to the front end of said telescoping boom means,
   cargo release means attached to said cargo support means,
   a bearing-plunger slidably attached to said telescoping boom means and reel mounted trip means connected to said cargo release means for releasing said cargo from said system when the horizontal velocity of said cargo relative to the ground is substantially zero.

2. The invention defined in claim 1, wherein said reel mounted trip means is connected to said aircraft at a point between the ends of said telescoping boom means.

References Cited

UNITED STATES PATENTS

| | | | |
|---|---|---|---|
| 2,319,881 | 5/1943 | Ray | 258—1.2 |
| 2,639,107 | 5/1953 | Brown | 244—137 X |
| 3,113,751 | 10/1963 | Cotton | 244—137 |

MILTON BUCHLER, *Primary Examiner.*

ALFRED E. CORRIGAN, *Examiner.*

T. BUCKMAN, *Assistant Examiner.*